United States Patent [19]

d'Alayer de Costemore d'Arc

[11] Patent Number: 4,468,406
[45] Date of Patent: Aug. 28, 1984

[54] METHOD FOR AUTOMATICALLY BREWING COFFEE AND MACHINE THEREFOR

[75] Inventor: Stephane M. d'Alayer de Costemore d'Arc, Ways, Belgium

[73] Assignee: Staar S.A., Brussels, Belgium

[21] Appl. No.: 379,716

[22] Filed: May 19, 1982

[30] Foreign Application Priority Data

May 20, 1981 [BE] Belgium .................. 888.878

[51] Int. Cl.³ .............................................. A23F 5/26
[52] U.S. Cl. .................... 426/231; 426/433; 99/280; 99/281; 99/282; 99/283
[58] Field of Search ............... 426/231, 433; 99/280-283; 364/479; 222/640, 641

[56] References Cited

U.S. PATENT DOCUMENTS

| | | | |
|---|---|---|---|
| 3,423,209 | 1/1969 | Weber | 426/433 |
| 3,898,428 | 8/1975 | Dye | 99/281 X |
| 3,948,156 | 4/1976 | Smith | 99/280 |
| 4,033,248 | 7/1977 | DiSalino | 99/281 |
| 4,172,413 | 10/1979 | Roseberry | 99/282 |
| 4,208,957 | 6/1980 | Bollman et al. | 99/283 X |
| 4,360,128 | 11/1982 | Neumann | 99/281 X |

FOREIGN PATENT DOCUMENTS 1579562  9/1969  Fed. Rep. of Germany .

Primary Examiner—Joseph M. Golian
Attorney, Agent, or Firm—Leydig, Voit, Osann Mayer and Holt, Ltd.

[57] ABSTRACT

A programmed control unit for a coffee machine is provided by which the number of cups and strength of coffee made by the machine may be selected. The unit controls the flow of hot water from the reservoir to the coffee in the filter depending on the number of cups selected. Also, the control unit operates to start brewing the coffee ahead of time set in by the user so that the coffee is ready at the time set into the dial.

5 Claims, 3 Drawing Figures

METHOD FOR AUTOMATICALLY BREWING COFFEE AND MACHINE THEREFOR

TECHNICAL FIELD

The present invention relates to a method for automatically brewing coffee and, more particularly, to a method for automatically brewing coffee and an electrically heated and powered coffee brewing machine using said method.

BACKGROUND ART

In conventional coffee brewing machines, water stored in a reservoir is heated by means of an electrical resistance to a temperature just below boiling and is operable, in addition to heating the water, to circulate the water from the reservoir to a discharge point above the coffee grounds maintained in a filter element. The hot water flows through the coffee grounds and filter into a coffee pot supported below the filter. Coffee brewing machines presently on the market are based on that arrangement and generally have their reservoir provided with graduations according to the number of cups (2, 4, 6, 8 ...) desired to be brewed. Each time the coffee brewing machines are used they operate to exhaust the water contained in the reservoir, which causes noise because of the use of check valves which fill with air, causing water vapor to be formed.

Another problem with such machines occurs when more water than needed for the number of cups to be brewed has been poured into the water reservoir; the user must use unconventional means to remove the excess, such as drawing down clear water into the coffee pot, first removing the filter and coffee grounds, or introducing a small cup to draw water before the coffee and the filter are placed in position in order to obtain the desired amount of water in the reservoir to begin the brewing process.

Moreover, to avoid build-up of excessive scale and for good operation purposes, it is recommended to leave water in the reservoir, heating element housing and tubing when the coffee brewing machine is not in operation. This is, however, not very practical with coffee brewing machines of the conventional type because the reservoir has been emptied completely, and the coffee pot cannot be used to pour water into the reservoir because it contains brewed coffee; thus it is difficult for the user to put water in the reservoir again.

DISCLOSURE OF THE INVENTION

The principal object of the present invention, accordingly, is to overcome the above mentioned drawbacks and problems with conventional machines by providing a method for brewing coffee which is based on the number of cups of coffee selected by the user and which permits entirely automatic control of the coffee brewing machine and accompanying elements to brew the selected number of cups of coffee.

A further object is to provide a method and machine receiving data relating to the number of cups desired by the user and, based on the data, controlling ground coffee dispensing means to automatically transfer into the filter element the exact amount of ground coffee needed for obtaining the number of cups wanted by the user.

Another object is to provide a method and machine for controlling the coffee brewing process according to a predetermined program based on data relating to the number of cups desired by the user.

The aforementioned objects are achieved according to the present invention by storing in memory signals representing timed periods of flow of hot water corresponding to the cups selected. Generating timed pulses, comparing a selected signal with accumulated timed pulses and terminating heating and flow of hot water at the termination of the timed period determined by such comparison.

BEST MODE FOR CARRYING OUT THE INVENTION

Figure 1:
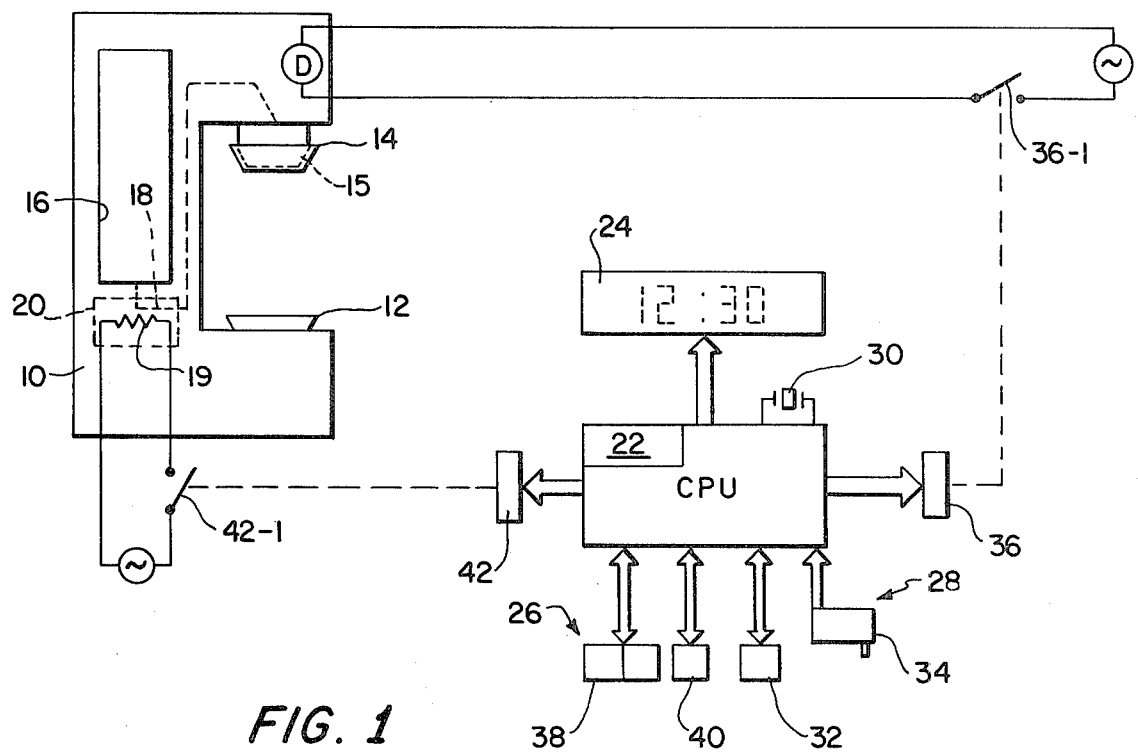
FIG. 1 is a schematic block diagram of the internal organization of a coffee brewing machine according to this invention.

Turning now to the drawings, the coffee brewing machine illustrated includes a conventional stand 10 providing a warming plate 12 for a coffee pot and a filter holder 14 for a filter 15 for ground coffee. This stand also provides a water reservoir 16 which may be filled from the top and tubing 18 that connects from the reservoir through a resistance element heater 19 in a housing 20 that is used to heat water from the reservoir 16 and circulate the water to flow to the filter 15 and through ground coffee contained in the filter into a pot for brewing coffee. As a further feature, a coffee dispensing apparatus is included, operated by a motor D to dispense ground coffee into the filter.

In carrying out the invention, a control system is provided for the coffee brewing and coffee dispensing components of the machine, including a central process unit (CPU) which may comprise a microprocessor, programmed logic array or similar integrated circuit which permits programmed operation to control the coffee machine components. Preferably, the CPU has associated therewith a static memory circuit 22 used in carrying out the method of this invention. In addition, the control system includes a numeric display device 24, such as an LCD, driven by the CPU, pushbutton or rotary manually adjusted input devices 26 for the CPU and indicator lights 28 representing certain aspects of the operation or condition of the coffee brewing machine. The CPU also receives time dependent signals from an oscillator circuit 30 or the like connected to input terminals.

Instead of operating the machine to carry out a coffee brewing method which involves emptying fully the reservoir 16 each coffee brewing cycle, the control system is constructed and programmed to carry out the method of this invention, which involves a timed flow of hot water from the reservoir 16 to the coffee filter 15, for a period which varies depending on the number of cups selected to be brewed in the machine. With this method, the reservoir 16 is filled, the number of cups selected by a pushbutton or rotary switch 32 and only that amount of water to brew the number of cups selected is caused to flow from the reservoir 16 through the filter 15 to the coffee pot.

While the water flow rate in a coffee machine will vary depending on the size of the flow passages, as an illustration of how to employ the method of this invention in practice, a conventional coffee brewing machine may be used with flow passages of such a size as to deliver quantities of hot water for brewing coffee according to the following schedule:

| Cups | Timed Flow (Minutes) |
|---|---|
| 2 | 2 |
| 4 | 4 |
| 6 | 6 |
| 8 | 8 |
| 10 | 10 |

Figure 2:
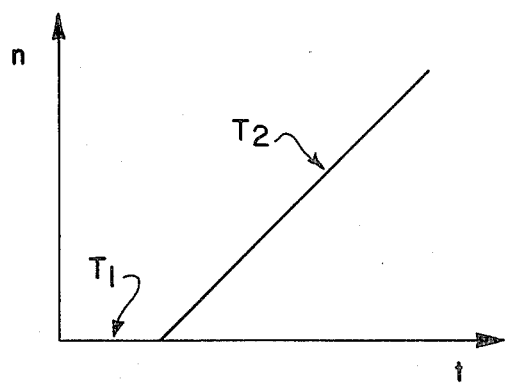
FIG. 2 is a graph illustrating the relationship between the number of cups selected and the time required for operation of the electrical resistance heating element to cause flow of water from the reservoir to the filter.

From the above schedule, graphically shown in FIG. 2, it will be noted that in the illustrative apparatus the number of cups brewed is an essentially linear function $T_2$ of the flow period, after a short constant period $T_1$ for heating water in the resistance element housing to bring it to just below boiling and to cause water to start flowing.

To carry out the method, a signal representing the timed period of hot water flow for a selected number of cups is derived from memory circuits 22 associated with the CUP of the control unit. This signal $P_1$, which is preferably in digital form representing a pulse count for a given time period of pulses generated at a predetermined frequency, such as 1 HZ, may include the constant time period $T_1$ for initially heating the water in the housing 20 of the electrical heating element 19 to a temperature just below boiling and which is represented by the horizontal segment $T_1$ of the curve in FIG. 2. Alternatively, a signal representing this constant time period $T_1$ may be added to the signal derived from memory, to produce a signal $P_1$ which represents the period for brewing a selected number of cups of coffee, including the initial period of heating $T_1$ and the subsequent period of heating and water flow illustrated by the upwardly inclined portion $T_2$ of the curve in FIG. 2 and which would terminate at a positive magnitude corresponding to the number of cups selected to be brewed.

Figure 3:
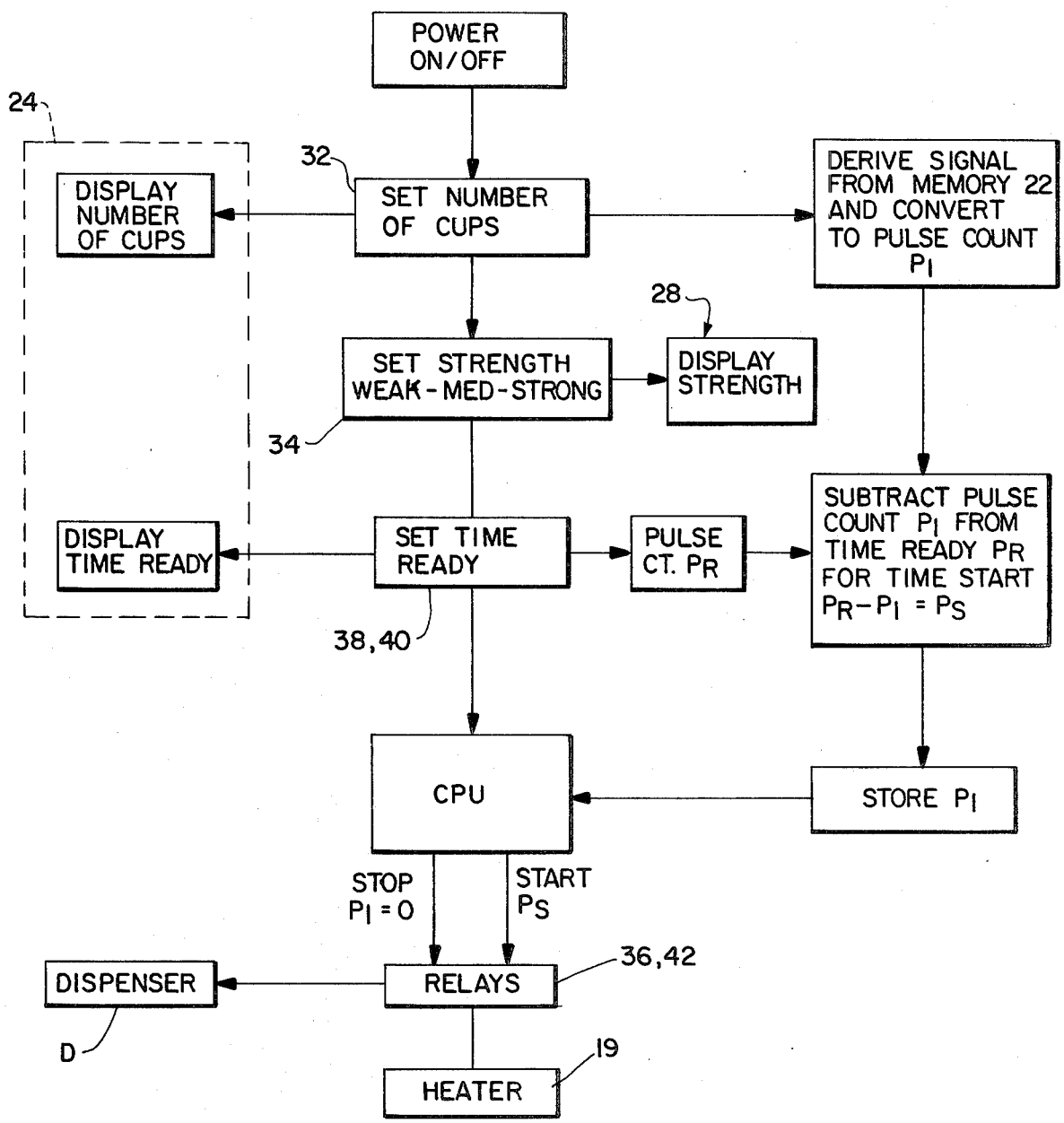
FIG. 3 is a flow chart of steps in the method of this invention.

As indicated in the flow chart of FIG. 3, after initiation of operation by turning power on, a pulse count $P_1$ is derived from memory corresponding to the number of cups selected by means of the switch 32. The method also involves selection of the strength of the coffee to be brewed. A rotary or three pushbutton selection switch 34 or the like is provided for this purpose and an indicator light 28 is operated to display the setting. Thus, according to the strength setting, the motor D of the dispenser is operated via a relay 36 and contacts 36-1 to dispense ground coffee into the filter 15 in a specified amount for medium strength, which is increased or decreased according to the strength of the coffee desired by the user.

FIG. 3 also indicates that the method involves setting the time at which the brewing process is completed rather than to start the machine at that time. With the time of preparation being known for the desired number of cups, according to this invention the control system is operated so as to start the brewing process ahead of the set time by the period required for brewing the selected number of cups. For this purpose, as indicated in FIG. 3, the "time ready" setting $P_R$ may be made by a manual keyboard or dial 38, the same dial 38 being used for resetting a time of day clock which drives the display 24. A selector switch 40 shifts the function of the setting switch 38 from time ready setting to clock resetting. The time ready setting $P_R$ is received by the CPU and shown in the display 24. A digital representation of the time ready setting $P_R$ may be used. To obtain the time start $P_S$, the pulse count $P_1$ representing the brewing period is subtracted from the time ready representation $P_R$ to obtain the time start signal $P_S$.

The pulse count $P_1$ is stored in memory circuits, preferably static memory circuits. The CPU is programmed to send a start signal at the starting time $P_S$ to the relay 42 with contacts 42-1 connected between a power source and the electrical resistance heating element 19 of the unit to start the energization of the heating element. After an initial period of the constant duration $T_1$ during which the water in the electrical resistance housing is raised to a temperature just below boiling, hot water is caused to flow from the reservoir to the filter 15 and the heating element 19 is continued to be energized. The CPU also includes clock circuits to generate timed pulses at a predetermined frequency, such as 1 HZ, which are transmitted for the brewing period. To determine when the selected timed period terminates, represented by the pulse count $P_1$, various techniques may be used. The signal stored in the memory 22 representing the timed period for a selected number of cups may be converted to a pulse count $P_1$ and transmitted from the clock source until the pulse count is reached. The 1 HZ timed pulses may be accumulated and compared with the pulse count $P_1$. When the accumulated timed pulses equal the pulse count $P_1$, the power control relay 42 is operated to deenergize the heating element 19. Determining when the selected timed period terminates may be achieved by decrementing a register of the CPU storing the pulse count $P_1$ by the 1 HZ pulses or by accumulating the 1 HZ pulses generated by the CPU in a register or the like and comparing the count in that register with the pulse count $P_1$ until they are equal. Other equivalent arrangements may be used.

One of the advantages of this method of controlling the brewing period is that, should there occur a loss of power to the brewing machine or the electrical resistance heating element 19 due to inadvertant or deliberate unplugging of the machine, or a power supply failure, the brewing procedure can resume after return of the electrical resistance heating element to proper temperature by continuing generation of the 1 HZ pulses from the CPU for the remaining period. It is particularly advantageous, therefore, to utilize a static form of memory for the register which will retain the accumulated pulses generated by the CPU so that, in the event of loss of power, the count may be resumed for the remainder of the time period. As an alternative arrangement, where the pulse count $P_1$ is stored in static memory which is decremented by the pulses generated by the CPU, the accumulated decremented pulse count will represent the relation between the number of cups to be brewed and the remainder of the water flow required to complete the brewing process for that number of cups.

For example, should the water run dry in the reservoir in the course of a brewing cycle due to the failure to fill the reservoir at the beginning, by a low water shut-off desirably incorporated in the equipment, the remainder of the brewing period will be stored and the brewing can be resumed after the reservoir has been refilled and the brewing carried out for the proper time for the number of cups desired. In addition to a low water shut-off, an alarm may be incorporated in the machine, as desired, to insure that in the reservoir and tubing there will always remain the minimum amount of water recommended for such coffee machines to prevent build-up of scale on these components.

Another feature of the invention involves a coffee dispenser apparatus, herein shown as a motor, operated to dispense into the filter the amount of ground coffee for making the desired number of cups. Referring to FIG. 3, the start signal at time $P_S$ may also be utilized to operate the relay 36 and its contacts 36-1 to connect the power supply to the dispenser motor D to dispense the ground coffee into the filter during the initial time $T_1$ when the water is being heated before the commencement of water flow. To operate the dispenser for dispensing the proper amount of coffee, a signal is supplied from the CPU according to the set number of cups and the strength of the coffee setting.

I claim:

1. A method for brewing coffee in a coffee machine having a reservoir for water and means including an electrical resistance heating element for heating water and causing hot water to flow from the reservoir through a filter containing ground coffee for brewing coffee, including the steps of:
   selecting the number of cups of coffee, to be brewed;
   deriving from electrical memory means a digital signal representing a pulse count of pulses generated at a predetermined frequency for a timed period of heating and hot water flow to brew a selected number of cups;
   storing said pulse count signal in static memory;
   heating and causing hot water to flow from said reservoir to said filter;
   generating pulses at said predetermined frequency and decrementing said pulse count signal with such generated pulses so that the remainder of a timed period represented by said signal is stored in said static memory in the event of a loss of power and interruption of water flow, allowing resumption of water flow for the remainder of said time period after power is restored, and
   terminating heating and flow of hot water in response to the pulse count signal being fully decremented, indicating the termination of said timed period for brewing the number of cups selected.

2. The method according to claim 1 wherein said electrical memory means stores digital signals representing the relation between a timed period to brew a number of cups, the relation including a constant period for initially heating the water and being substantially linear after hot water is caused to flow.

3. The method according to claim 1 for a coffee machine also having a coffee dispenser including the step of operating the coffee dispenser to dispense the amount of coffee into the filter corresponding to the number of cups selected.

4. The method according to claim 1, 2 or 3 including the steps of:
   setting the time for brewed coffee to be ready;
   generating a signal representing the set time;
   substracting said signal representing a time period of flow of water from said signal representing said set time to produce a start signal;
   heating and causing hot water to flow from said reservoir to said filter in response to said start signal so that the brewed coffee is ready at said set time.

5. A method for brewing coffee in a coffee machine having a reservoir for water and means including an electrical resistance heating element for heating water and causing hot water to flow from the reservoir through a filter containing ground coffee for brewing coffee, including the steps of:
   selecting the number of cups of coffee to be brewed;
   deriving from electrical memory means a digital signal representing a pulse count of pulses generated at a predetermined frequency for a timed period of heating and hot water flow to brew a selected number of cups;
   storing said pulse count signal in static memory;
   heating and causing hot water to flow from said reservoir to said filter;
   generating pulses at said predetermined frequency and decrementing said pulse count signal with such generated pulses after a constant period for initially heating the water; and
   terminating heating and flow of hot water in response to said pulse count signal being fully decremented, indicating the termination of said timed period for brewing the number of cups selected.

* * * * *